(12) United States Patent
Aflatouni et al.

(10) Patent No.: US 10,634,845 B2
(45) Date of Patent: Apr. 28, 2020

(54) INTEGRATED PLANAR OPTICAL PHASED ARRAY

(71) Applicant: California Institute of Technology, Pasadena, CA (US)

(72) Inventors: Firooz Aflatouni, Pasadena, CA (US); Behrooz Abiri, Pasadena, CA (US); Seyed Ali Hajimiri, La Canada, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 14/791,187

(22) Filed: Jul. 2, 2015

(65) Prior Publication Data

US 2017/0168233 A1 Jun. 15, 2017

Related U.S. Application Data

(63) Continuation of application No. 13/770,980, filed on Feb. 19, 2013, now Pat. No. 9,081,252.

(Continued)

(51) Int. Cl.
  *G02B 26/00* (2006.01)
  *G02F 1/01* (2006.01)
  (Continued)

(52) U.S. Cl.
  CPC .............. *G02B 6/124* (2013.01); *G02B 6/34* (2013.01); *G02F 1/025* (2013.01); *G02F 1/218* (2013.01); *G02F 1/292* (2013.01); *G02F 2203/15* (2013.01)

(58) Field of Classification Search
  CPC ........ G02F 1/011; G02F 1/0121; G02F 1/025; H04B 10/2504; H04B 10/671;
  (Continued)

(56) References Cited

U.S. PATENT DOCUMENTS 5,886,671 A  3/1999 Riemer et al.
6,469,822 B1 10/2002 Zhu
(Continued)

OTHER PUBLICATIONS

PCT International Search Report and Written Opinion of the International Search Authority for application PCT/US2013/026753 dated Jun. 27, 2013.

(Continued)

*Primary Examiner* — Mahidere S Sahle
(74) *Attorney, Agent, or Firm* — Alston & Bird LLP

(57) ABSTRACT

An optical phased array includes, in part, a multitude of optical signal emitters and a multitude of optical signal phase/delay elements each associated with and disposed between a different pair of the optical signal emitters. Each optical signal phase/delay element is adapted to cause a phase/delay shift between the optical signals emitted from its associated pair of optical signal emitters. Each optical signal phase/delay element is optically a ring resonator that includes a p-i-n junction. By varying the bias applied to the p-i-n junction, the phase/delay generated by the ring resonator is varied. Furthermore, each optical signal emitter is optionally an optical grating having a multitude of grooves. The groove lengths of the optical gratings are optionally selected so as to increase along the direction of travel of the input optical signal through the optical phase array.

44 Claims, 16 Drawing Sheets

Related U.S. Application Data

(60) Provisional application No. 61/599,801, filed on Feb. 16, 2012.

(51) Int. Cl.

| | | |
|---|---|---|
| *G02B 6/124* | (2006.01) | |
| *G02F 1/025* | (2006.01) | |
| *G02B 6/34* | (2006.01) | |
| *G02F 1/29* | (2006.01) | |
| *G02F 1/21* | (2006.01) | |

(58) Field of Classification Search
CPC ......... H04B 10/2507; H04B 10/50577; H04B 10/548; G02B 6/124; G02B 6/34; G02B 6/2861; G02B 6/2935; G02B 6/29352
USPC .................................. 359/238–244
See application file for complete search history.

(56) References Cited

U.S. PATENT DOCUMENTS

| | | |
|---|---|---|
| 6,927,745 B2 | 8/2005 | Brown et al. |
| 7,907,324 B2* | 3/2011 | Hoshida ............... G02F 1/0123 359/239 |
| 2005/0242993 A1 | 11/2005 | Hein |
| 2009/0034968 A1* | 2/2009 | Cherchi ............ G02B 6/12007 398/43 |
| 2010/0231452 A1* | 9/2010 | Babakhani ............. G01S 7/032 342/368 |
| 2010/0231999 A1 | 9/2010 | Kroll et al. |
| 2011/0249979 A1 | 10/2011 | Sheng et al. |

OTHER PUBLICATIONS

PCT International Preliminary Report on Patentability for application PCT/US2013/026753 dated Aug. 19, 2014.
U.S. Appl. No. 13/770,980, Non-Final Office Action dated Jun. 5, 2014.
U.S. Appl. No. 13/770,980, Response to Non-Final Office Action filed Dec. 3, 2014.
U.S. Appl. No. 13/770,980, Notice of Allowance dated Mar. 13, 2015.
Resler, et al., "High-efficiency liquid-crystal optical phased-array beam steering," *Opt. Lett.*, 21(9): 689-691, (1996).
Katz, et al., "Diffraction coupled phase-locked semiconductor laser array," *Appl. Phys. Lett.*, 42(7): 554-556, (1983).
Liang, et al., "Tiled-aperture coherent beam combining using optical phase-lock loops," *Electronics Letters*, 44(14), (2008).
Bogaerts, et al., "Low-loss, low-cross-talk crossings for silicon-on-insulator nanophotonic waveguides," *Optics Letters*, 32(19): 2801-2803, (2007).

* cited by examiner

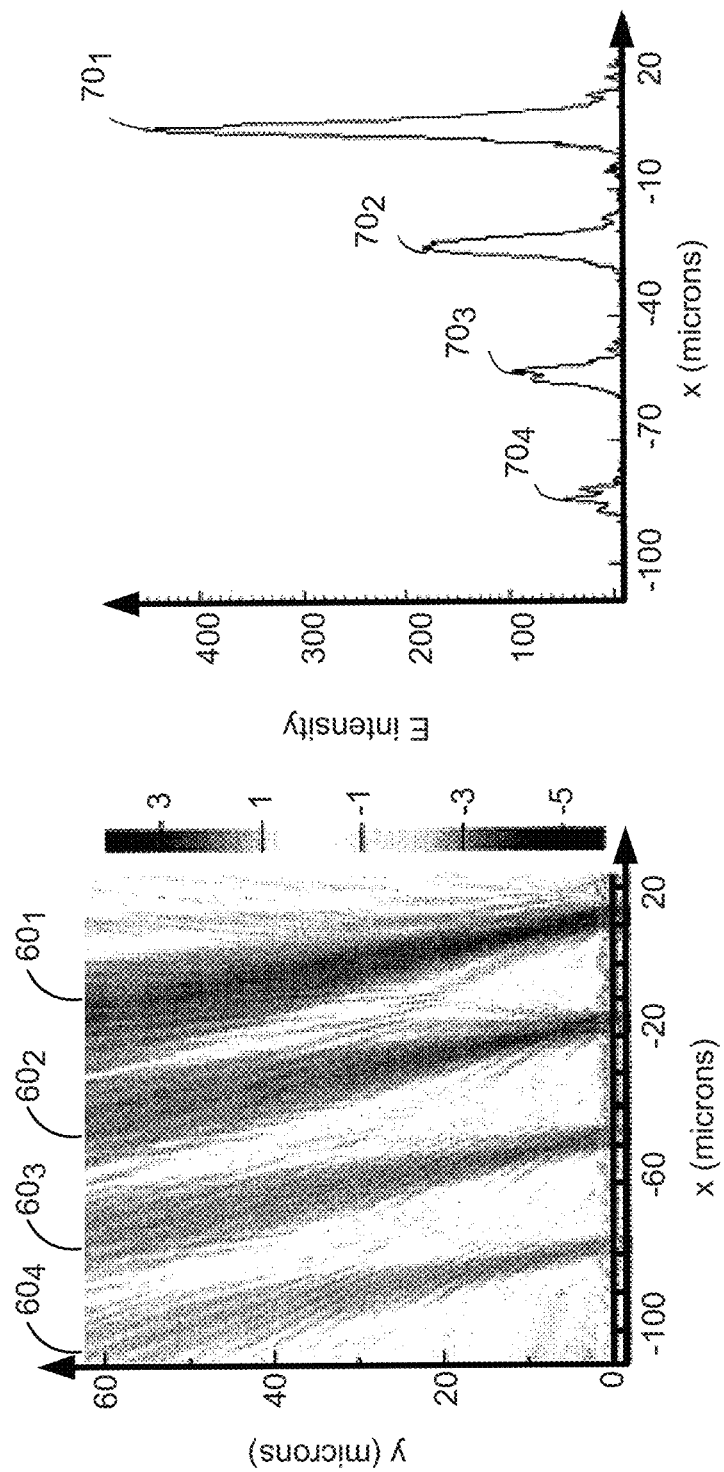

INTEGRATED PLANAR OPTICAL PHASED ARRAY

CROSS-REFERENCE TO RELATED APPLICATIONS

The present application is a continuation of U.S. patent application Ser. No. 13/770,980, filed Feb. 19, 2013, entitled "Integrated Tow-Dimensional Planar Otpical Phased Array," and claims benefit under 35 USC 119 (e) of U.S. Provisional Application No. 61/599,801, filed Feb. 16, 2012, entitled "Integrated Optical Phased Arrays", the content of which is incorporated herein by reference in its entirety.

FIELD OF THE INVENTION

The present invention is related to phased arrays, and more particularly to an integrated optical phase array.

BACKGROUND OF THE INVENTION

RF and mm-wave phased arrays are being increasingly used in a variety of applications, such as communication, imaging, beam steering, and radar. However, efforts in developing optical phased arrays have had limited success. Conventional optical phased arrays are formed using such techniques as injection locking of lasers in the array, single laser with array of phase modulators, and phase locking of multiple semiconductor lasers. However, conventional optical phased arrays have a number of disadvantages. For example, they are formed using bulky optical components, require complex control systems to minimize the effect of environment fluctuations, consume a significant area, and are otherwise difficult to scale.

A need continues to exist for an optical phased array that is highly integrated, has a reduced sensitivity to environment fluctuations, and consumes a significantly smaller area than conventional optical phased arrays.

BRIEF SUMMARY OF THE INVENTION

An optical phased array, in accordance with one embodiment of the present invention includes, in part, a first array of N optical signal emitters and a first array of M optical signal delay elements, wherein N is an integer greater than or equal to 2 and M is an integer greater than or equal to one. Each optical signal delay element is associated with and disposed between a different pair of optical signal emitters and is adapted to cause a phase/delay shift between optical signals emitted from its associated pair of optical signal emitters in response to a first input optical signal received by the optical phased array.

In one embodiment, the phase/delay shift caused by each of the optical signal delay elements is variable. In one embodiment, the delays caused by at least a subset of the optical signal phase/delay elements are varied so as to change the angle of an optical signal generated due to interference between one or more of the optical signals. In one embodiment, each of the optical signal phase/delay elements is a ring resonator. In one embodiment, each of the optical ring resonators is a p-i-n junction adapted to cause a phase/delay shift in response to an applied bias.

In one embodiment, each of the optical signal emitters is an optical grating that includes a plurality of grooves. In one embodiment, the groove lengths of the optical gratings are selected so as to increase along a direction of travel of the first input optical signal through the optical phase array. In one embodiment, the groove lengths of the optical gratings are selected so as to achieve a substantially similar intensity for the emitted optical signals.

In one embodiment, the phased array includes, in part, a second array of N optical signal emitters formed parallel to the first array of the N optical signal emitters, and a second array of M optical signal delay elements. Each optical signal delay element of the second array is associated with and disposed between a different pair of optical signal emitters of the second array and is adapted to cause a phase/delay shift between optical signals emitted from its associated pair of optical signal emitters in response to a second input optical signal received by the optical phased array.

In one embodiment, the N optical signals emitted from the first array of N optical signal emitters and the N optical signals emitted from the second array N of optical signal emitters have substantially similar wavelengths. In one embodiment, the first array of optical signal emitters and the first array of optical signal delay elements are formed in the same semiconductor substrate. In one embodiment, the first and second arrays of optical signal emitters, and the first and second arrays of optical signal delay elements are formed in the same semiconductor substrate. In one embodiment, the first and second input optical signals are derived from the same source of optical signal.

In one embodiment, the phased array further includes, in part, a second array of optical signal emitters and a second array of optical signal delay elements. Each optical signal delay element of the second array is associated with and disposed between a different pair of optical signal emitters of the second array and is adapted to cause a phase/delay shift between optical signals emitted from its associated pair of optical signal emitters in response to a second input optical signal received by the optical phased array. The second array of N optical signal emitters may be formed either above or below the first array of the N optical signal emitters.

In one embodiment, the optical signals emitted by the first array of optical signal emitters are substantially parallel to the surface of the substrate in which the first array of optical signal emitters and the first array of optical signal delay elements are formed. In another embodiment, the optical signals emitted by the first array of optical signal emitters are substantially perpendicular to the surface of a substrate in which the first array of optical signal emitters and the first array of optical signal delay elements are formed.

A method of generating N optical signals, in accordance with one embodiment of the present invention, includes, in part, forming a first array of N optical signal emitters, and forming a first array of M optical signal delay elements. Each optical signal delay element is associated with and disposed between a different pair of optical signal emitters and is adapted to cause a phase/delay shift between optical signals emitted from its associated pair of optical signal emitters in response to a first input optical signal received by the optical phased array. N is an integer greater than or equal to 2 and M is an integer greater than or equal to one.

In one embodiment, the method further includes, in part, varying the delay across one or more of the optical signal phase/delay elements. In one embodiment, the method further includes, in part, varying the delay across at least a first subset of the optical signal delay elements so as to change the angle of an optical signal generated due to interference between one or more of the optical signals emitted by the optical signal emitters.

In one embodiment, at least one of the optical signal phase/delay elements is a ring resonator. In one embodiment, at least one of the optical ring resonators is a p-i-n junction adapted to cause a phase/delay shift in response to an applied bias. In one embodiment, at least one of the optical signal emitters is an optical grating that includes a multitude of grooves.

In one embodiment, the method further includes, in part, selecting groove lengths of the optical gratings in an increasing order along a direction of travel of the first input optical signal through the optical phase array. In one embodiment, the method further includes, in part, selecting the groove lengths of the optical gratings such that intensities of the emitted optical signals are substantially similar.

In one embodiment, the method further includes, in part, forming a second array of N optical signal emitters parallel to the first array of the N optical signal emitters, and forming a second array of M optical signal delay elements. Each optical signal delay element of the second array is associated with and disposed between a different pair of optical signal emitters of the second array and is adapted to cause a phase/delay shift between optical signals emitted from its associated pair of optical signal emitters in response to a second input optical signal received by the optical phased array.

In one embodiment, the optical signals emitted from the first array of optical signal emitters and the optical signals emitted from the second array of optical signal emitters have the same wavelength. In one embodiment, the first array of optical signal emitters and the first array of optical signal delay elements are formed in the same semiconductor substrate. In one embodiment, the first and second arrays of optical signal emitters, and the first and second arrays of the optical signal delay elements are formed in the same semiconductor substrate. In one embodiment, the first and second optical signals are generated from the same source of optical signal.

In one embodiment, the method further includes, in part, forming the first array of optical signal emitters and the first array of optical signal delay elements in the same semiconductor substrate. The method further includes, in part, forming the second array of optical signal emitters and optical signal phase/delay elements either above or below the first array of optical signal emitters. Each optical signal delay element of the second array is associated with and disposed between a different pair of optical signal emitters of the second array and is adapted to cause a phase/delay shift between the optical signals emitted from its associated pair of optical signal emitters in response to a second input optical signal received by the optical phased array.

In one embodiment, the optical signals emitted by the first array of optical signal emitters are substantially parallel to the surface of the substrate in which the first array of optical signal emitters and the first array of optical signal delay elements are formed. In another embodiment, the optical signals emitted by the first array of optical signal emitters are substantially perpendicular to the surface of a substrate in which the first array of optical signal emitters and the first array of optical signal delay elements are formed.

BRIEF DESCRIPTION OF THE DRAWINGS

FIG. 7 shows an exemplary emission profile of the output beams of the optical phased array shown in FIG. 3A.

FIG. 8 shows an exemplary intensity of the output beams of the optical phased array shown in FIG. 3A.

DETAILED DESCRIPTION OF THE INVENTION

Figure 1:
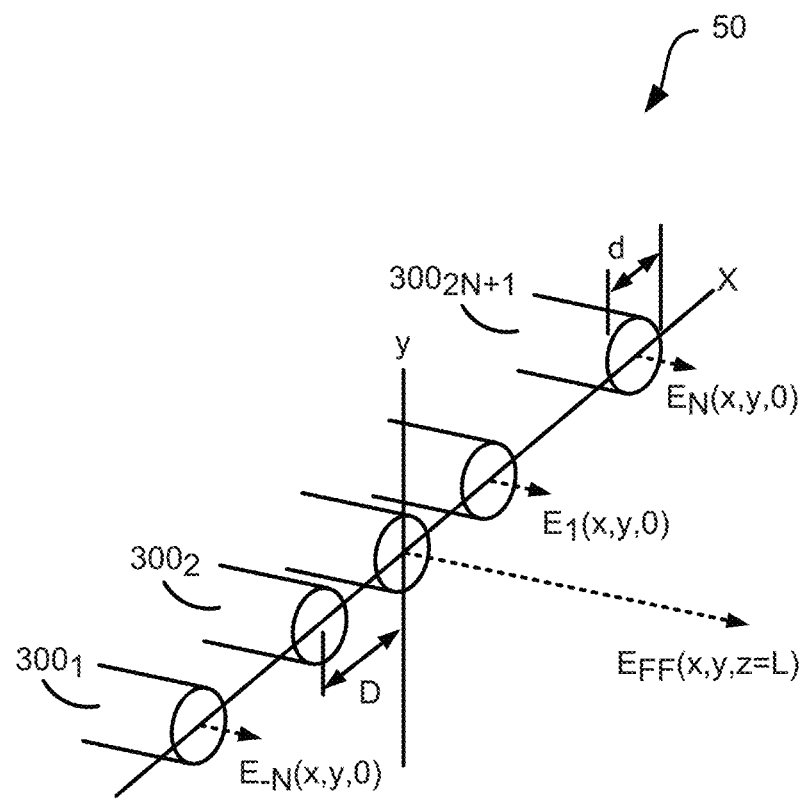
FIG. 1 shows a one-dimensional array of collimated optical signals.

FIG. 1 shows a one-dimensional optical phased array 50 having 2N+1 collimated optical signals $300_1$, $300_2$ ... $300_{(2N+1)}$ travelling along the z axis. Each optical signal (alternatively referred to herein as beam) is shown as having a diameter d, and spaced away from an adjacent beam by distance D along the x-axis. Assume that each beam has a Gaussian profile, and has the same wavelength $\lambda_0$ with the same optical power $P_0$. Accordingly, the electric field at the point of emission for each beam may be obtained using the following expression:

$$E_n(x, y, 0) = E_0 e^{jn\phi} e^{\frac{-4}{d^2}[(x-nD)^2+y^2]} \quad (1)$$

where $E_0$, n, and $\emptyset$ are respectively the electric field constant, element index, and the constant phase difference between adjacent elements.

Applying the Fraunhofer far field approximation, the far field intensity of the electric field at distance z=L may be determined using the following:

$$I(x, y, L) = \frac{E_0^2 d^4}{\lambda_0^2 L^2}\left|W\left(\frac{2\pi d}{\lambda_0 L}x, \frac{2\pi d}{\lambda_0 L}y\right)\right|^2 \left|G\left(\frac{2\pi D}{\lambda_0 L}x - \phi\right)\right|^2 \quad (2)$$

where $$W(k_x, k_y) = \mathcal{F}\left[e^{\frac{-4}{d^2}[(x-nD)^2+y^2]}\right],$$

$$G(\Omega) = \sum_n^N = -Ne^{-jn\Omega},$$

and $\mathcal{F}$ represents the 2D Fourier transform, respectively. Expression (2) may be further simplified to:

$$I(x, y, L) = \frac{E_0^2 d^4 \pi^2}{16\lambda_0^2 L^2} e^{\frac{-\pi^2 d^2}{2\lambda_0^2 L^2}(x^2+y^2)} \times \frac{\sin^2\left[(2N+1)\frac{\pi D}{\lambda_0 L}x - \frac{\phi}{2}\right]}{\sin^2\left[\frac{\pi D}{\lambda_0 L}x - \frac{\phi}{2}\right]} \quad (3)$$

As is seen from expression (3), the electric field intensity of at any point L may be varied by varying $\emptyset$ which is the difference between phases of adjacent beams. The Fourier transform of the profile of the individual beams defines the envelope (proportional to $$\frac{\lambda_0 L}{d})$$

within which the beam may be steered.

Due to finite size of the optical phased array 50 and periodic nature of $G(\Omega)$, side lobes appear in the far field pattern. The position of the main lobe and the position of its adjacent side lobes may be calculated from Expression 3. The ratio between the main lobe and the adjacent side lobe, commonly referred to as the side lobe suppression ratio (SLSR), may be calculated using the following expression:

$$SLSR = \frac{I(x_{main}, y, L)}{(x_{side}, y, L)} \quad (4)$$

Using Expressions 3 and 4, the maximum steering angle for a given SLSR may be substantially defined as:

$$\Phi_{max} = \left[1 - \frac{2}{\pi^2}\left(\frac{D}{d}\right)\ln(SLSR)\right]\pi \quad (5)$$

Figure 2:
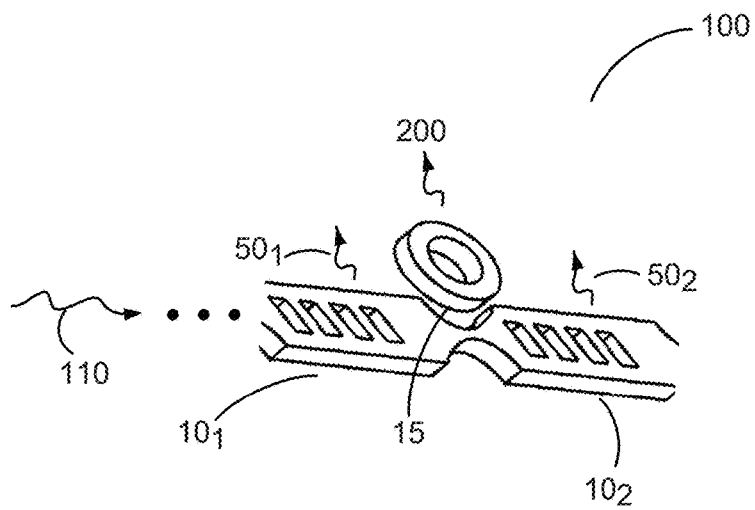
FIG. 2 is a simplified perspective view of a one-dimensional array of optical signal radiators and delay elements, in accordance with one embodiment of the present invention.

FIG. 2 is a simplified perspective view of an array 100 of optical signal radiators and delay element (also referred to hereinbelow as optical phased array or phased array), in accordance with one embodiment of the present invention. Phased array 100 is shown as including first and second optical signals radiators $10_1$, $10_2$—forming an array of optical signal radiators (signal emitters)—and an optical phase/delay element 15 disposed between the optical signal radiators. Although phased array 100 is shown as including two optical signal radiators and an optical delay element, it is understood that a phased array in accordance with the present invention may include any number of optical signal radiators and optical phase/delay elements. For example, FIG. 3A shows a one-dimensional optical phased array 175 having four optical signal radiators $10_1$, $10_2$, $10_3$, $10_4$—forming an array of optical signal emitters—and three variable optical phase/delay elements $15_1$, $15_2$, $15_3$—forming an array of optical signal phase/delay elements—disposed between the optical radiators.

Referring to FIG. 2, in response to an incident optical signal 110 received by phased array 100, optical signal radiators $10_1$ and $10_2$ respectively generate first and second optical signals $50_1$, $50_2$ that are combined (due to interference) to generate an output optical signal 200 at a far field of the phased array. The difference between the phases of optical signals $50_1$, $50_2$ is defined by the amount of delay generated by variable optical phase/delay element 15. By controlling and varying this phase difference, the degree of interference between optical signals $50_1$, $50_2$ and thereby the direction of the output optical signal 200 may be varied. For example, the delay across delay element 15 may be selected such that optical signals $50_1$, $50_2$ have substantially the same phase thereby to achieve constructive interference between these signals, thus moving optical signal 200 in one direction. Similarly, the delay across delay element 15 may be selected such that the phase difference between output signals $50_1$, $50_2$ satisfies one or more other conditions thus moving optical signal 200 in another direction.

Figure 3A:
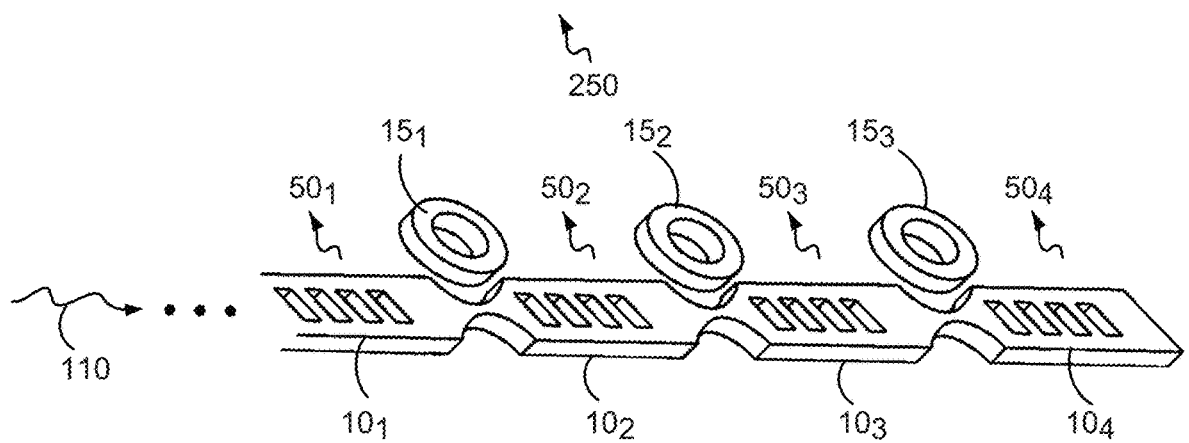
FIG. 3A is a simplified perspective view of a one-dimensional array of optical signal radiators and delay elements, in accordance with another embodiment of the present invention.

Referring to FIG. 3A, optical phase/delay elements $15_1$ is adapted to control the phase difference between optical signals $50_1$, $50_2$ radiated respectively by optical signal radiators $10_1$, $10_2$; optical phase/delay elements $15_2$ is adapted to control the phase difference between optical signals $50_2$, $50_3$ radiated respectively by optical signal radiators $10_2$, $10_3$; and optical phase/delay elements $15_3$ is adapted to control the phase difference between optical signals $50_3$, $50_4$ radiated respectively by optical signal radiators $10_3$, $10_4$. By controlling such phase differences, the direction of optical output signal 250—generated as a result of interference between optical signals $50_1$, $50_2$, $50_3$ and $50_4$—may be varied.

In one embodiment, each of optical radiators $10_i$ (i is an integer equal to or greater than 2) may be an optical grating, and each delay element $15_j$ (j is an integer equal to or greater than 1) may be a ring resonator for the embodiment shown in FIG. 2. The following description, in accordance with the present invention, is provided with reference to an optical phased array formed using optical gratings that radiate optical signals (i.e, optical signal radiators), and ring resonators that generates optical signal phase/delay (i.e., optical delay element). It is understood, however, that an optical phased array, in accordance with the present invention, may include any other optical radiator such as edge couplers, and any other delay element such as disk resonators and cavity resonators.

Figure 3B:
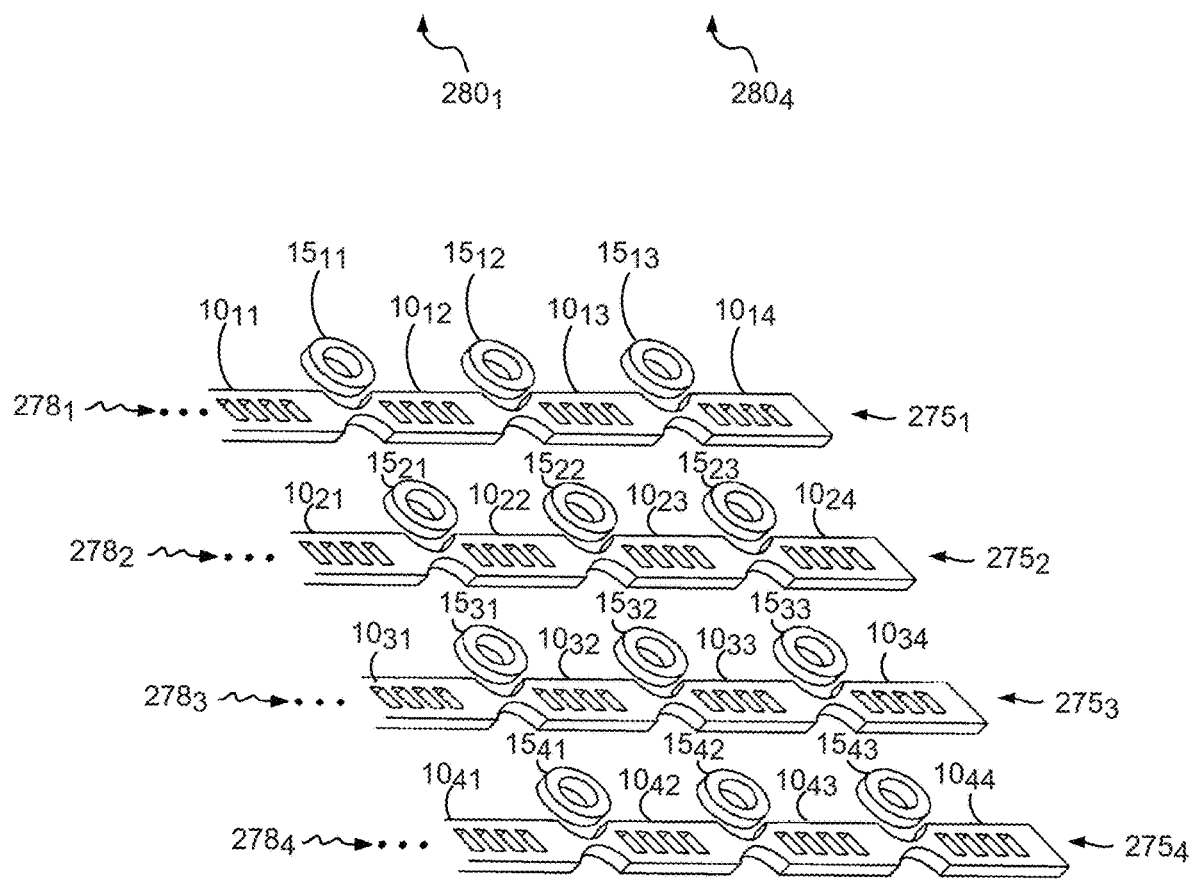
FIG. 3B is a simplified perspective view of a two-dimensional array of optical signal radiators and delay elements, in accordance with another embodiment of the present invention.

FIG. 3B is a perspective view of a two-dimensional optical phased array 270 having four arrays $275_1$, $275_2$, $275_3$, $275_4$ each shown as including four optical signal emitters and three optical signal phase/delay elements. The optical signal phase/delay in each array is associated with and disposed between a different pair of optical signal emitters of that array. Phased array 270 thus has sixteen optical signal emitters $10_{ij}$ and fifteen optical phase/delay elements $15_{ij}$, where i is an index identifying the array number and j is an index identifying a relative position of the optical signal emitter or the optical signal phase/delay element disposed in that array. For example, array $275_1$ is shown as including optical signal emitters $10_{11}$, $10_{12}$, $10_{13}$, $10_{14}$ and optical phase/delay elements $15_{11}$, $15_{12}$, $15_{13}$. Likewise, array $275_4$ is shown as including optical signal emitters $10_{41}$, $10_{42}$, $10_{43}$, $10_{44}$ and optical phase/delay elements $15_{41}$, $15_{42}$, $15_{43}$. In each array, each optical signal phase/delay element is associated with and disposed between a different pair of optical signal emitters disposed in that array. For example, optical signal phase/delay element $15_{11}$ is associated with and disposed between optical signal emitter $10_{11}$, $10_{12}$; optical signal phase/delay $15_{12}$ is associated with and disposed between optical signal emitter $10_{12}$, $10_{13}$; and optical signal phase/delay $15_{32}$ is associated with and disposed between optical signal emitter $10_{32}$, $10_{33}$.

As seen in FIG. 3B, each array $275_i$ is shown as receiving an input optical signal $278_i$. Input optical signals $278_1$, $278_2$, $278_3$, and $278_4$ may have the same wavelength. As described herein, the phase/delay of the optical signal travelling through each array is independently controlled—using the optical signal phase/delay elements of that array-so as to vary the degree of interference between the four optical signals emitted from that array in order to vary the angle of the optical signal that is formed as a result of this interference. For example, by varying the phase/delay of the optical phase/delay elements $15_{11}$, $15_{12}$, $15_{13}$, the degree of interference between the optical signals (not shown) emitted by emitters $10_{11}$, $10_{12}$, $10_{13}$, $10_{14}$ may be varied so as to change the angle of optical signal $280_1$ generated as a result of the interference between these four signals. Likewise, by varying the phase/delay of the optical phase/delay elements $15_{41}$, $15_{42}$, $15_{43}$, the degree of interference between the optical signals (not shown) emitted by emitters $10_{41}$, $10_{42}$, $10_{43}$, $10_{44}$ may be varied so as to change the angle of optical signal $280_4$ generated as a result of the interference between these four signals. In one embodiment, optical phased array 270 is formed on one or more semiconductor substrates.

Figure 3C:
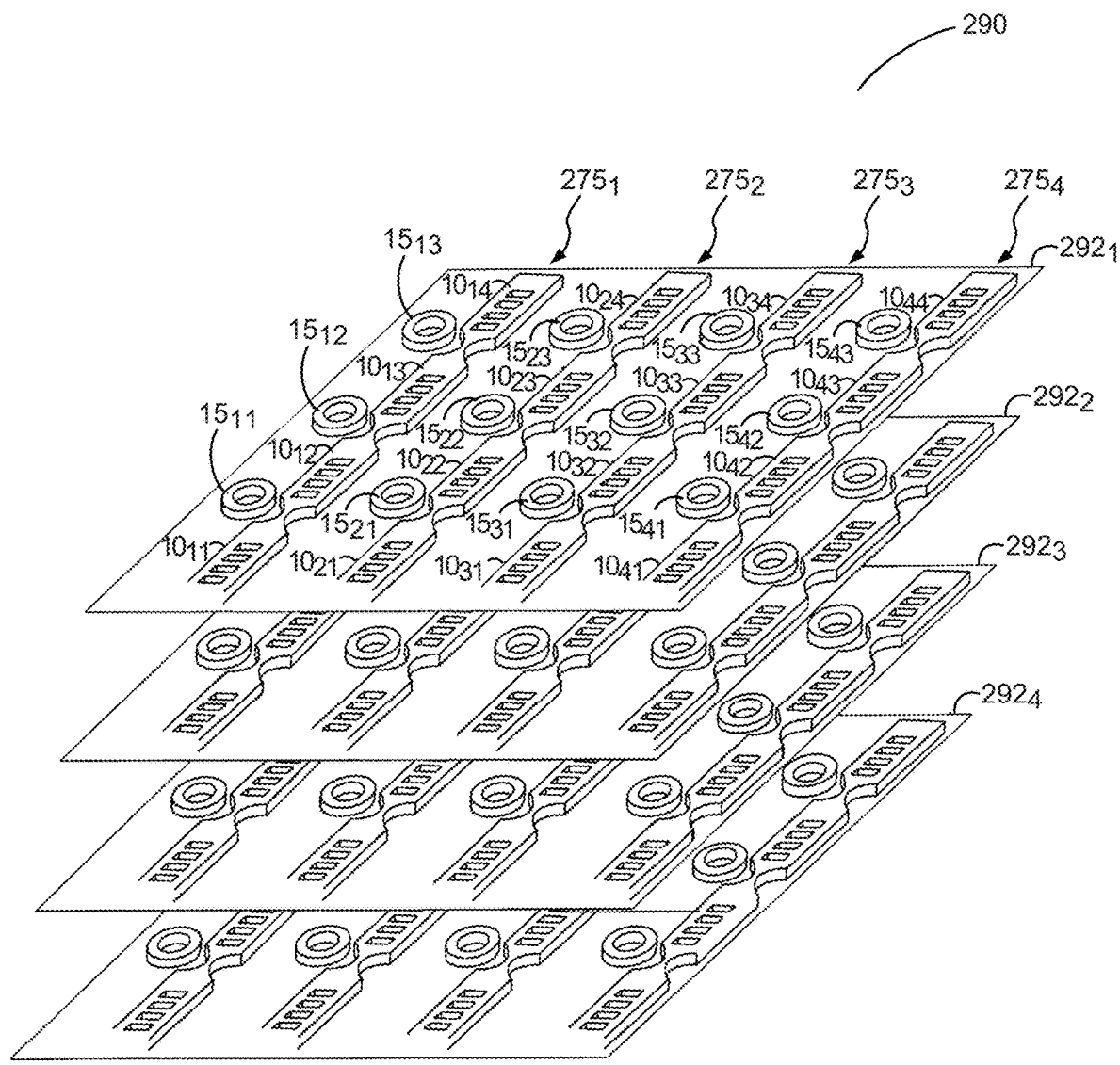
FIG. 3C is a simplified perspective view of a stack of two-dimensional arrays of optical signal radiators and delay elements, in accordance with another embodiment of the present invention.

FIG. 3C shows a three-dimensional optical phased array 290 formed using a stack of four two-dimensional arrays $292_1$, $292_2$, $292_3$, $292_4$ each having four arrays $275_1$, $275_2$, $275_3$, $275_4$, as described above with reference to FIG. 3B. Each of the arrays $292_k$, where k is an integer varying from 1 to 4 in this exemplary embodiment, may be formed in a different substrate or layer. Arrays $292_k$ are then positioned above or below each other to form the stack.

Figure 4A:
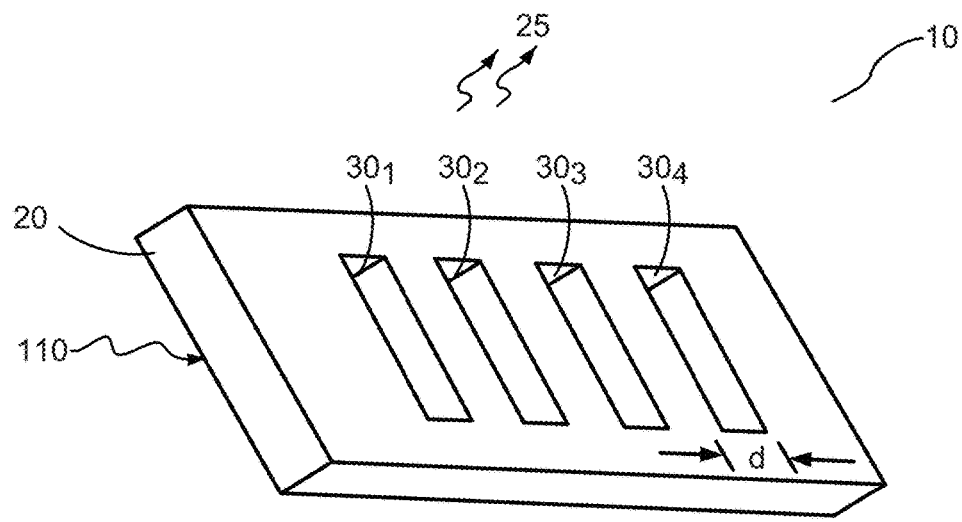
FIG. 4A is a perspective view of an optical grating adapted to provide optical signal phase/delay, in accordance with one embodiment of the present invention.

FIG. 4A is a perspective view of an exemplary embodiment of an optical grating 10 as used in an optical phased array, such as those shown in FIGS. 2 and 3A-3C, in accordance with the present invention. Optical grating 10 is shown as including four similarly sized grooves $30_1$, $30_2$, $30_3$ and $30_4$. Although exemplary optical grating 10 is shown as including four grooves, it is understood that optical grating 10 may have more or fewer than four groves. Incoming optical signal 110 incident on surface 20 of optical grating (hereinafter alternatively referred to as grating) 10 is scattered due to Bragg effect, thus resulting in a fraction of the incident optical signal to radiate (emit) outward, identified using reference number 25. Grating 10 emits light if the wavelength of the optical signal (alternatively referred to herein as "light beam" or "beam") 110 travelling through the grating is smaller than the grating period.

Figure 4B:
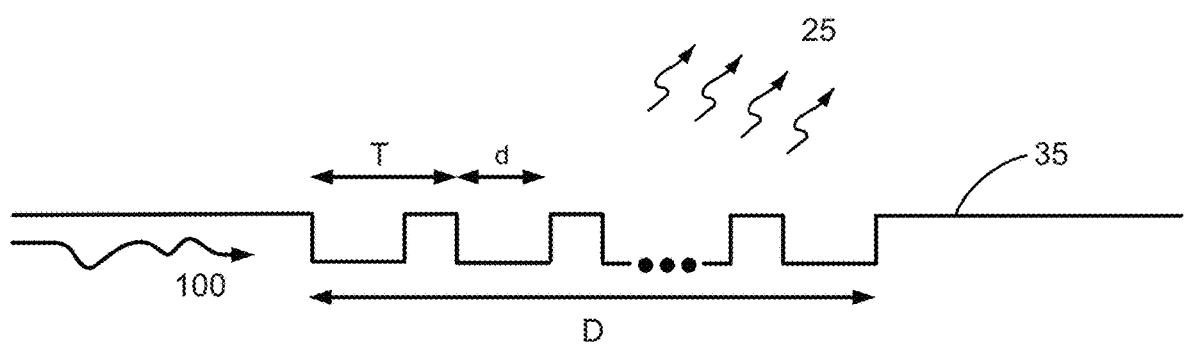
FIG. 4B is a cross-sectional view of the optical grating of FIG. 4A.
Figure 5A:
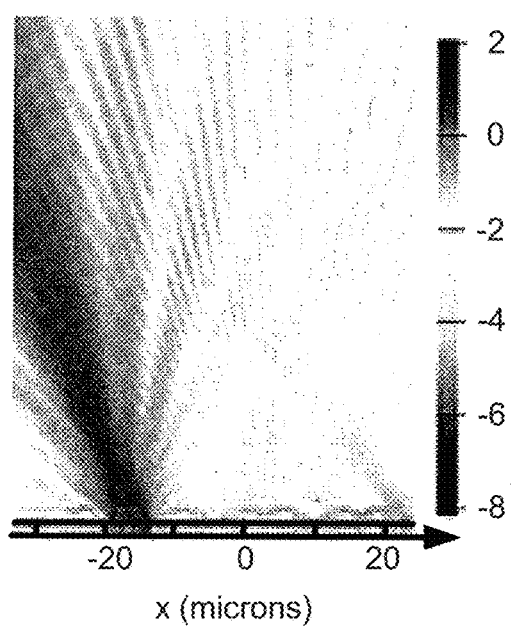
FIGS. 5A-5D show the effect of the grating period on the beam divergence associated with the optical grating of FIG. 4A.
Figure 5B:
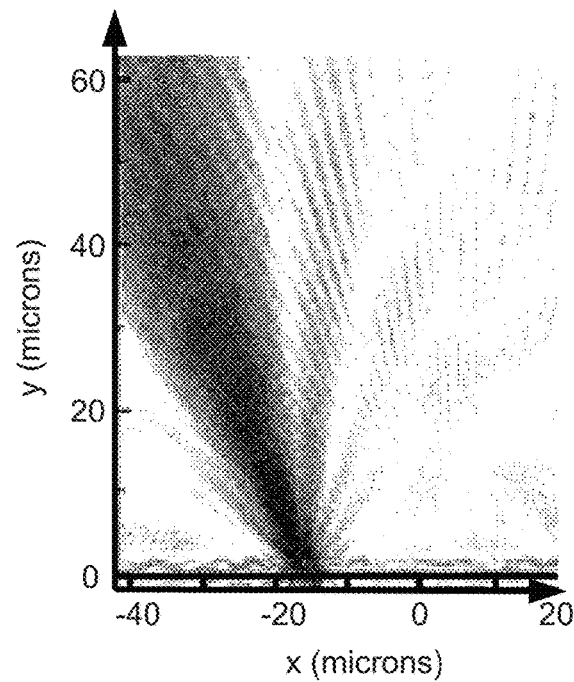
Figure 5C:
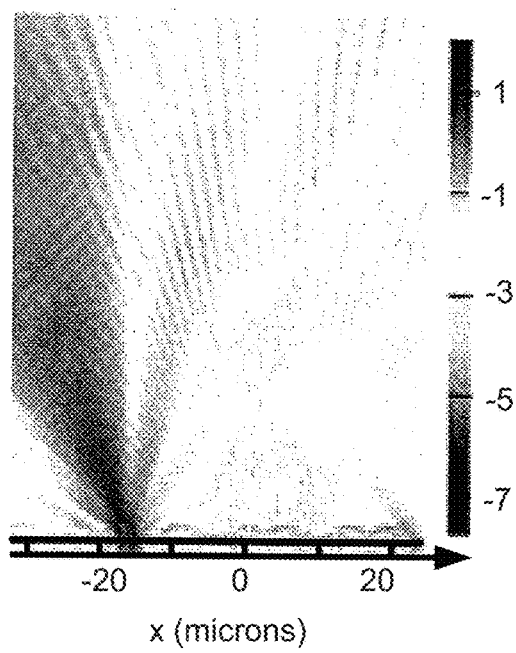
Figure 5D:
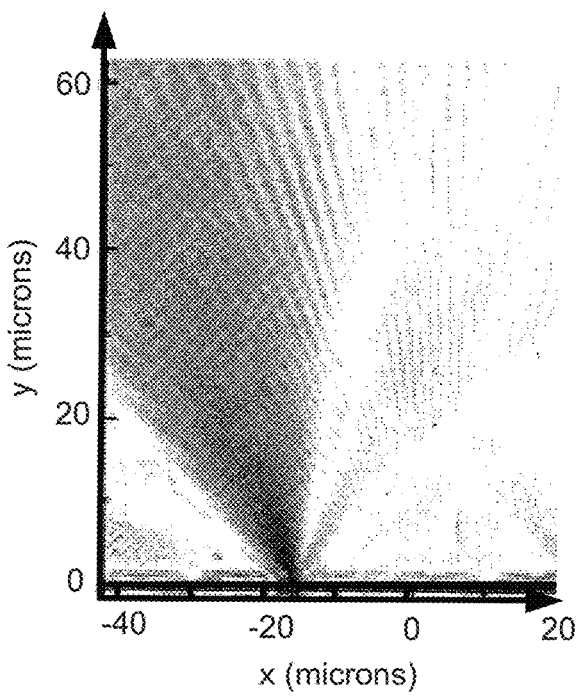
Figure 6B:
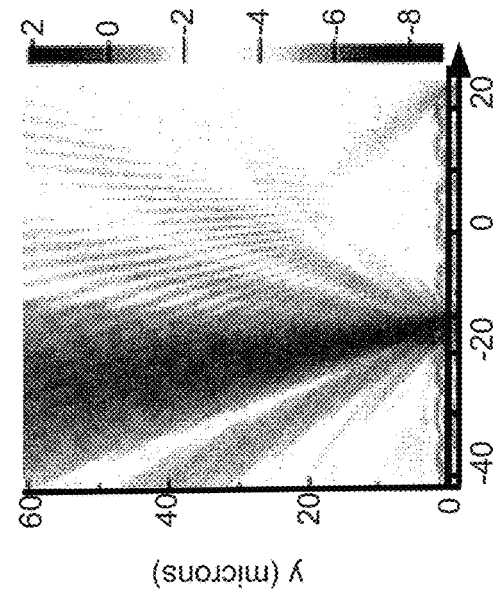
FIGS. 6A-6D show the effect of the grating period on the beam emission angle associated with the optical grating of FIG. 4A.
Figure 6D:
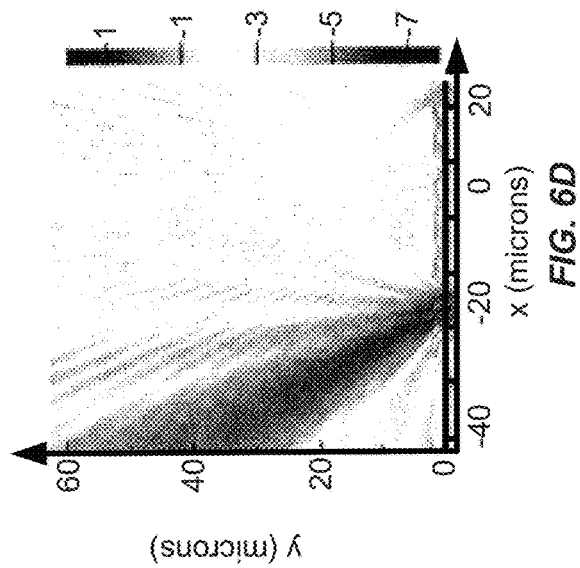
Figure 6A:
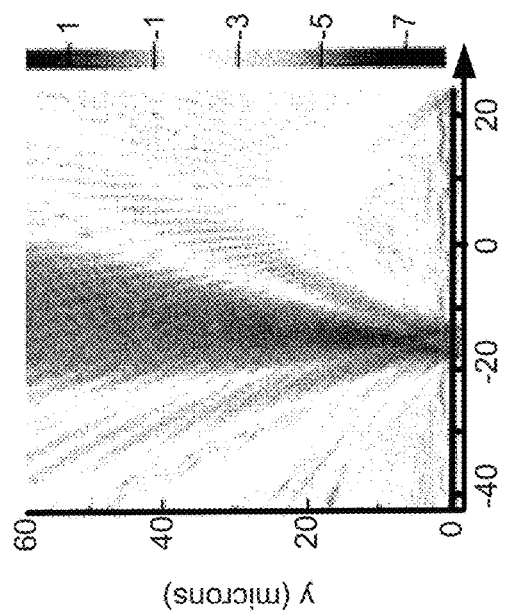
Figure 6C:
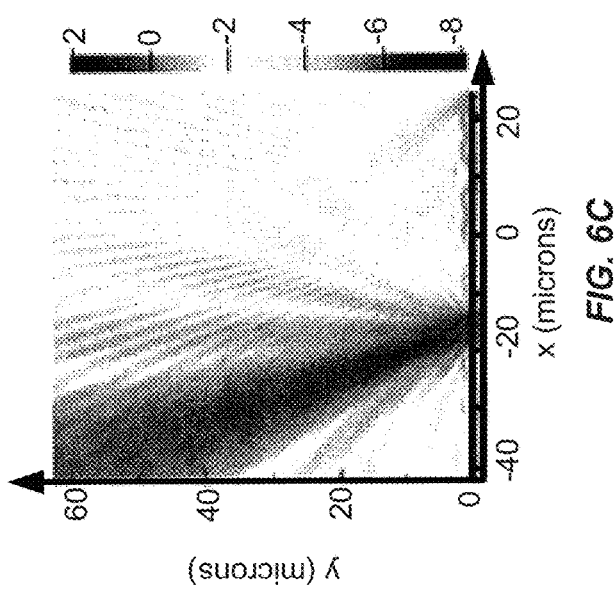

FIG. 4B is a cross-sectional view of grating 10 having a groove width d, a grating period T, and a groove span of D. The groove width to grating period $$\frac{d}{T}$$

defines the angle of propagation of the outgoing optical beam 25, the coupling efficiency, and the beam divergence. FIGS. 5A-5D show the effect of the grating period on the beam divergence. The groove width to grating period $$\frac{d}{T}$$

associated with each of FIGS. 5A-5D is 0.75, and the grating periods T associated with FIGS. 5A, 5B, 5C, and 5D are respectively 1.0, 0.93, 0.85, and 0.78. As seen by comparing FIGS. 5A-5D, for the same groove width to grating period $$\frac{d}{T},$$

the smaller the grating period, the larger is the degree of divergence of the output beam.

FIGS. 6A-6D show the effect of the grating period on the beam emission angle. The groove span D to the grating period associated T with FIGS. 6A, 6B, 6C, and 6D are respectively selected to have values of 10, 8, 6, and 4. As seen by comparing FIGS. 6A-6D, the higher the grating period, the larger is the emission angle relative to the normal emission plane 35 (see FIG. 4B).

FIGS. 7 and 8 respectively show the emission profile and the intensity of the output beams $50_1$, $50_2$, $50_3$, and $50_4$, of optical phased array 175 of FIG. 3A formed in a semiconductor substrate. Gratings $10_1$, $10_2$, $10_3$, and $10_4$ (collectively and alternatively referred to herein as gratings 10) are selected to have the same period T of 650 nm, width d (see FIGS. 4A and 4B) of 1300 nm and placed 30 μm apart from one another. Referring to FIG. 7, the mission profiles of output signals $50_1$, $50_2$, $50_3$, and $50_4$ are respectively identified as $60_k$, $60_2$, $60_3$ and $60_4$. Referring to FIG. 8, the intensity of output signals $50_1$, $50_2$, $50_3$, and $50_4$ are respectively identified as $70_k$, $70_2$, $70_3$ and $70_4$. As is seen from FIG. 8, since each grating emits a portion of the light it receives, the intensity of the output beams decreases as the light travels through the array of gratings.

Figure 9:
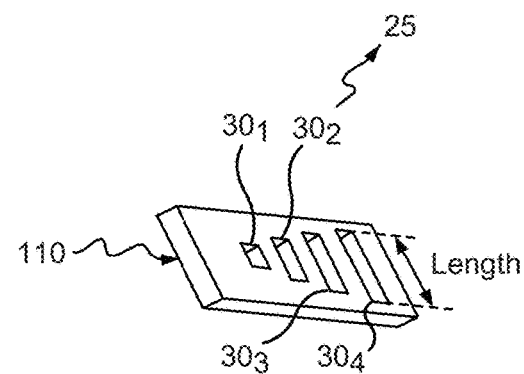
FIG. 9 is a perspective view of an optical grating adapted to provide optical signal phase/delay, in accordance with another embodiment of the present invention.

FIG. 9 is a perspective view of another exemplary embodiment of an optical grating 10 as used in an optical phased array, in accordance with the present invention. Optical grating 10 of FIG. 9 is shown as including four grooves $30_k$, $30_2$, $30_3$ and $30_4$ that are tapered such that the length L of the grooves increases in succession along the direction of the beam travel. Accordingly, groove $30_2$ is selected to be longer than groove $30_1$; groove $30_3$ is selected to be longer than groove $30_2$; and groove $30_4$ is selected to be longer than groove $30_3$. Although exemplary grating 10 of FIG. 9 is shown as including four grooves, it is understood that grating 10 may have more or fewer than four groves. By selecting the grooves to have increasingly greater lengths along the direction of travel of the received optical signal 110, the intensity of the output beam 25 radiated out from grating 10 may be varied.

Figure 10:
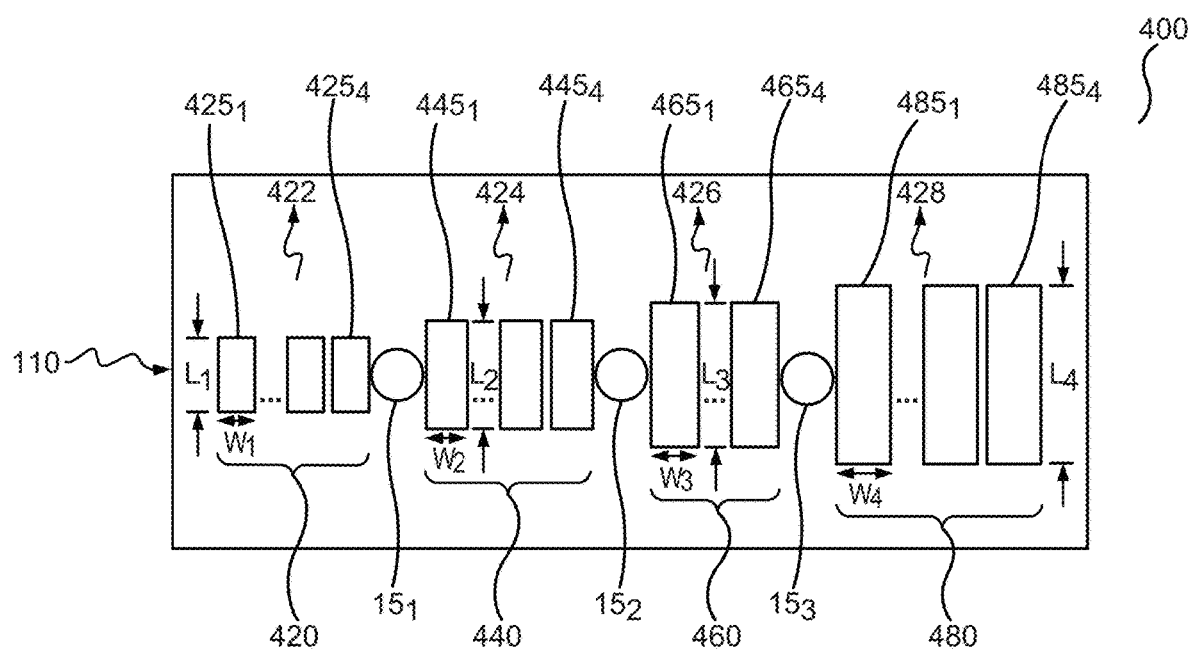
FIG. 10 is a simplified top view of a one-dimensional array of optical signal radiators and delay elements, in accordance with another exemplary embodiment of the present invention.

FIG. 10 is a simplified top view of an optical phased array 400, in accordance with another exemplary embodiment of the present invention. Phased array 400 is shown as including four gratings 420, 440, 460, 480, and three optical phase/delay elements $15_1$, $15_2$ and $15_3$ respectively disposed between gratings 440/420, 460/440 and 480/460. The grooves in each grating have substantially the same lengths and widths. Accordingly, grooves $425_1$, $425_2$, $425_3$, $425_4$ (collectively referred to as grooves 425) of grating 420 have substantially the same length $L_1$ and width $W_1$. Likewise, grooves $445_1$, $445_2$, $445_3$, $445_4$ (collectively referred to as grooves 445) of grating 440 have substantially the same length $L_2$ and width $W_2$; grooves $465_1$, $465_2$, $465_3$, $465_4$ (collectively referred to as grooves 465) of grating 460 have substantially the same length $L_3$ and width $W_3$; and grooves $485_1$, $485_2$, $485_3$, $485_4$ (collectively referred to as grooves 485) of grating 480 have substantially the same length $L_4$ and width $W_4$. Furthermore, the length of the grooves of each grating is greater than the length of the grooves of the adjacent grating from which that grating receives the incoming optical signal. In other words, the groove lengths of neighboring gratings increase along the direction of incoming beam travel. Accordingly $L_2$ is selected to be greater than $L_1$, $L_3$ is selected to be greater than $L_2$, and $L_4$ is selected to be greater than $L_2$. Although optical phased array 400 is shown as including four gratings each having four grooves, it is understood that an optical phased array, in accordance with the present invention, may have any number of gratings each having any number of groves.

Figure 11:
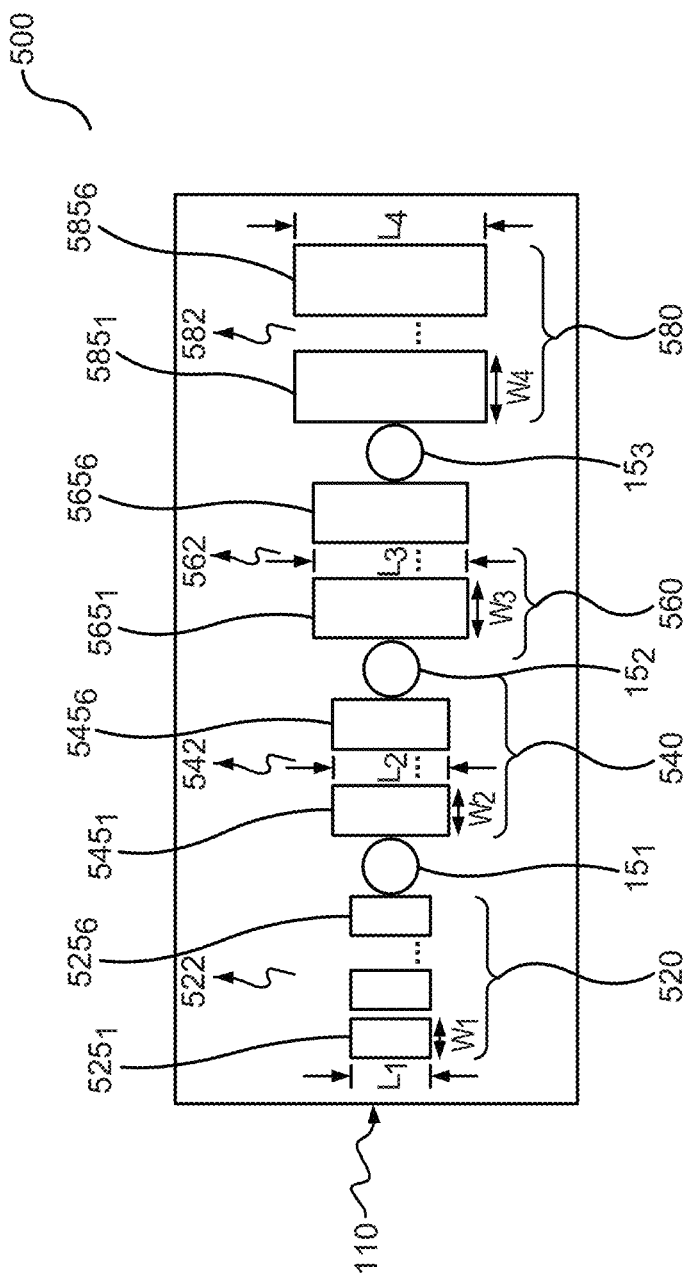
FIG. 11 is a simplified top view of a one-dimensional array of optical signal radiators and delay elements, in accordance with another exemplary embodiment of the present invention.

FIG. 11 is a simplified top view of an optical phased array 500, in accordance with another exemplary embodiment of the present invention. Phased array 500 is shown as including four gratings 520, 540, 560, 580 each having six grooves. Phased array 400 is also shown as including three optical phase/delay elements $15_1$, $15_2$ and $15_3$ respectively disposed between gratings 540/520, 560/540 and 580/560.

The grooves in each grating of phased array 500 have substantially the same size. Accordingly, for example, grooves $525_1$, $525_2$, $525_3$, $525_4$, $525_5$, $525_6$ (collectively referred to as grooves 525) of grating 520 have substantially the same length $L_1$ and width $W_1$. Likewise, grooves $545_1$, $545_2$, $545_3$, $545_4$, $545_5$, $545_6$ (collectively referred to as grooves 545) of grating 540 have substantially the same length $L_2$ and width $W_2$; grooves $565_1$, $565_2$, $565_3$, $565_4$, $565_5$, $565_6$ (collectively referred to as grooves 565) of grating 560 have substantially the same length $L_3$ and width $W_3$; and grooves $585_1$, $585_2$, $585_3$, $585_4$, $585_5$, $585_6$ (collectively referred to as grooves 585) of grating 580 have substantially the same length $L_4$ and width $W_4$. Furthermore, the length and width of the grooves in each grating are greater than the length and width of the grooves of the adjacent grating from which that grating receives the incoming optical signal. In other words, the groove lengths and widths of neighboring gratings increase along the direction of the beam travel. Accordingly $L_2$ is selected to be greater than $L_1$, $L_3$ is selected to be greater than $L_2$, and $L_4$ is selected to be greater than $L_3$. Likewise, $W_2$ is selected to be greater than $W_1$, $W_3$ is selected to be greater than $W_2$, and $W_4$ is selected to be greater than $W_3$. Consequently, the intensity of the output beam radiating from gratings 520, 540, 560, and 580 are controlled so as to be, for example, substantially similar. Gratings 520, 540, 560, and 580 are respectively shown as radiating output beams 522, 545, 562, and 582. Although optical phased array 500 is shown as including four gratings each having six grooves, it is understood that an optical phased array, in accordance with the present invention, may have any number of gratings each having any number of groves.

Figure 12A:
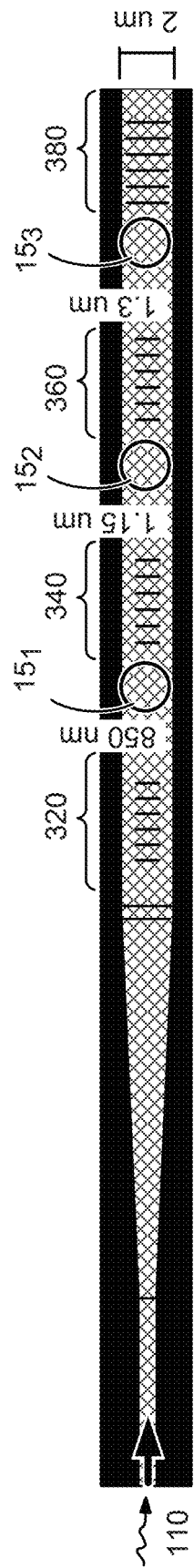
FIG. 12A is a simplified top view of a one-dimensional array of optical signal radiators and delay elements, in accordance with another exemplary embodiment of the present invention.

FIG. 12A is a simplified top view of an optical phased array 300, in accordance with another exemplary embodiment of the present invention. Phased array 300 is shown as including, in part, four gratings 320, 340, 360, 380, and three optical phase/delay elements $15_1$, $15_2$, $15_3$ disposed between the gratings, as shown. Each grating is shown as including six grooves. The grooves in all the gratings have substantially the same width. The grooves in grating 320 have the length of 850 nm; the grooves in grating 340 have the length of 1.15 μm; the grooves in grating 360 have the length of 1.30 μm; and the grooves in grating 380 have the length of 2.0 μm. Accordingly, the lengths of the grooves increase along the direction of the incoming input optical signal 110.

Figure 12C:
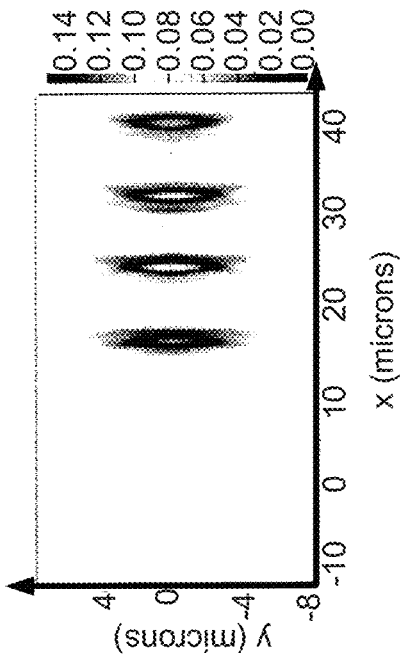
FIGS. 12B, 12C and 12D are exemplary simulation results respectively of the emission profiles, the projections of the beams above the phased array, and the intensity of the beams radiating from the optical phased array of FIG. 12A.
Figure 12B:
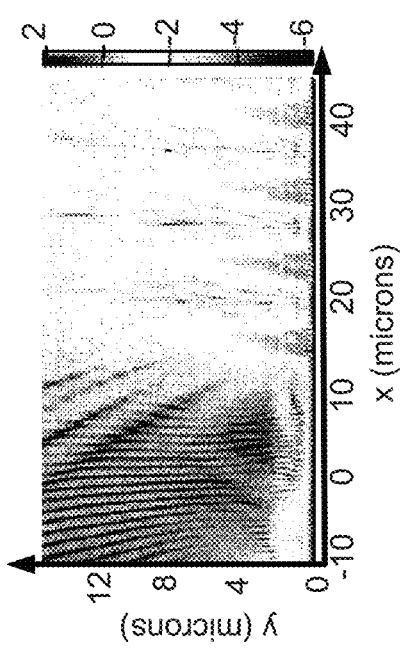
Figure 12D:
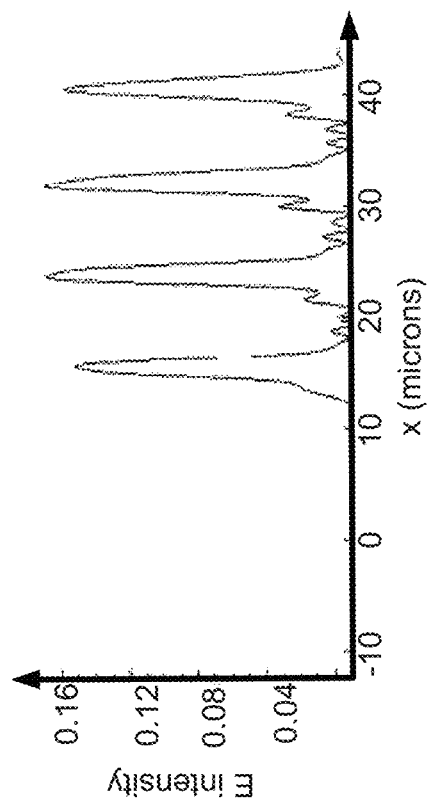

FIGS. 12B, 12C and 12D respectively show the simulation results of the emission profiles, the projections of the beams 2000 nm above the phased array, and the intensity of the beams radiating from gratings 320, 340, 360, 380 of phased array 300 of FIG. 12A (see FIG. 4). As is seen from FIG. 12D, intensity plots 442, 444, 464, 484 associated respectively with output beams 422, 442, 462, 482 (emitted respectively by gratins 420, 440, 460 and 480) have substantially similar peaks and characteristics. In other words, by selecting the grating lengths, in accordance with the present invention and as described above, substantially equal beam intensities are radiated from the gratings of the phased array.

Figure 13:
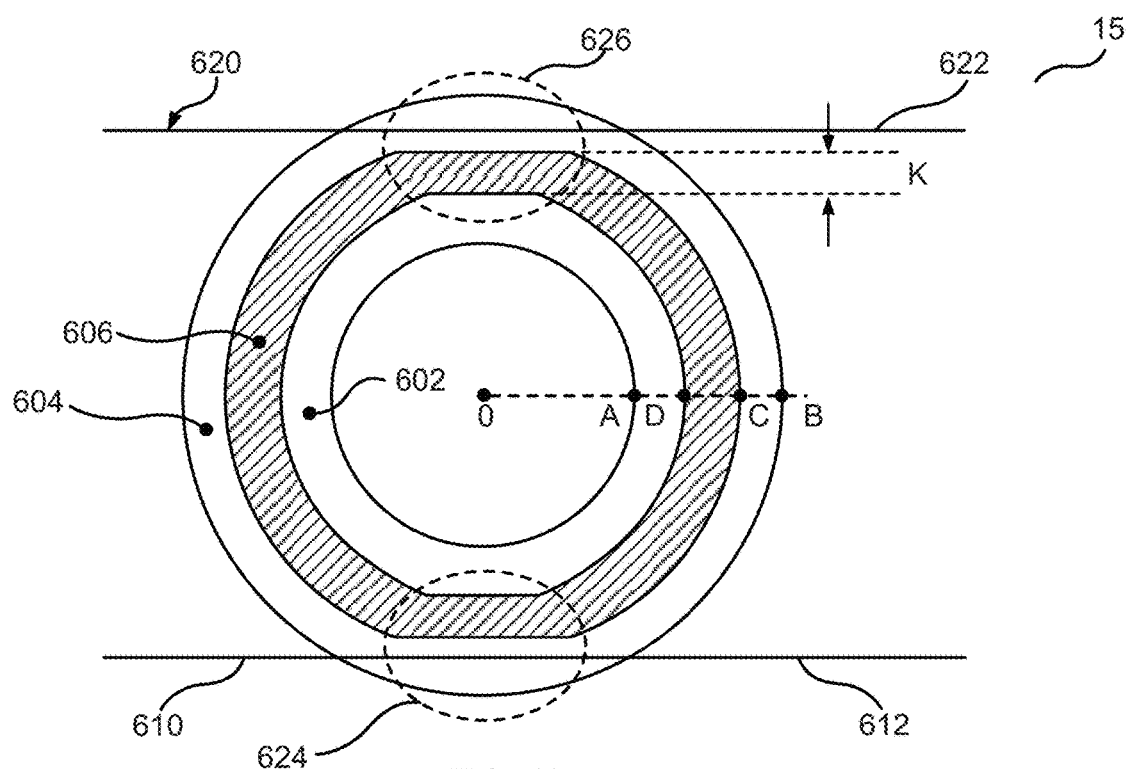
FIG. 13 is a top view of a ring resonator disposed in an optical phased array in accordance with one exemplary embodiment of the present invention.

FIG. 13 is a top view of an exemplary embodiment of a ring resonator 15 as used in an optical phased array (such as those shown in FIGS. 2 and 3), in accordance with the present invention. An incoming optical signal is received by ring resonator 15 via its input port 610, and supplied as an output optical signal via its output port (also commonly known as through port) 612. Ring resonator 15 is a p-i-n junction formed in a semiconductor substrate and includes a highly doped P++ region 602, a highly doped N++ region 604, and an intrinsic region 606. Ring resonator 15 is adapted to perform optical phase shifting around its resonance frequency by changing its index of refraction through biasing of the p-i-n junction. Distances AD, DC, and CB, characterized by a line radially extending from the center of the ring and away from the input/output ports, respectively define the widths of the P++, intrinsic, and N++ regions. Ring resonator 15 is also shown as including a drop port 620 and an isolation port 622. As is seen from FIG. 13, near the coupling regions 624 and 626, intrinsic region 606 has a reduced width of k to maximize the coupling. Away from the coupling regions 624, 626, the intrinsic region has a greater width defined by the distance DC to minimize signal loss in the ring.

In one example, the width of the p-i-n junction along a radial line extending from the center of the ring (e.g., from point A to point B) is 2.5 µm; the radius of the circle from the center of the ring to center of the intrinsic region in areas away from the ports is 3.2 µm. Near the coupling regions 624, 626, the intrinsic region has a width K of 300 nm. Away from the coupling regions, the width of the intrinsic region (e.g., the distance between points D and C) is 1.2 µm. With these dimensions, simulations show that the ring may cause more than 50° phase shift for an amplitude change of less than 10%.

Figure 14A:
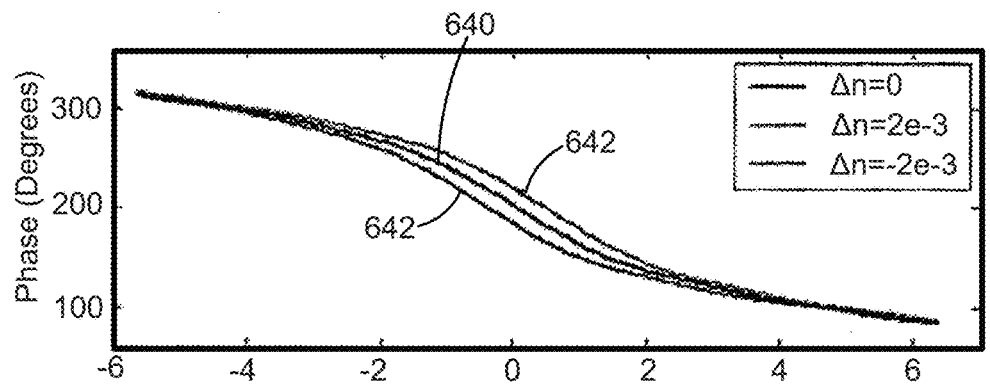
FIGS. 14A and 14B are exemplary computer simulation results of amplitude and phase response of a ring resonator, in accordance with one embodiment of the present invention.
Figure 14B:
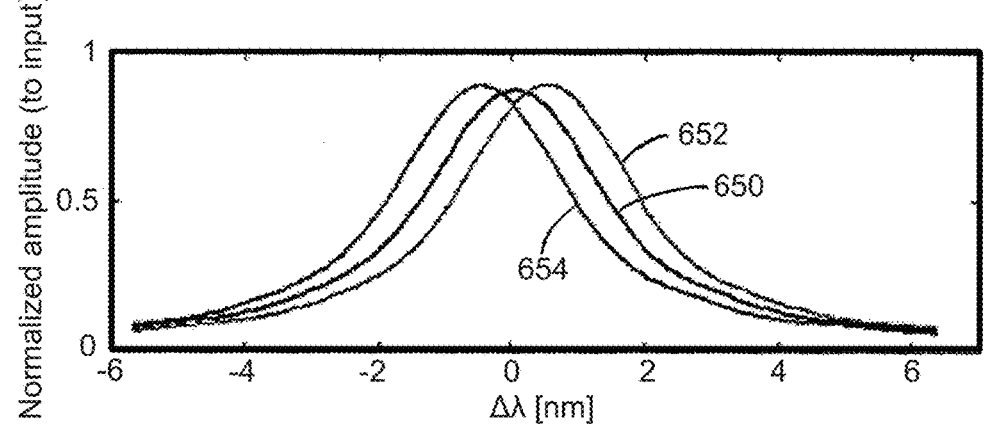

FIGS. 14A and 14B are computer simulation results for amplitude and phase response of a ring resonator, having the dimensions described above, normalized with respect to an optical signal having a wavelength of 1556 nm received via the resonator's input port and supplied via the resonator's drop port. Referring to FIG. 14A, plot 640 shows the phase response of the resonator when the resonator receives no bias and thus its index of refraction is unchanged. Plots 642 and 644 show the phase response of the resonator when the index of the refraction of the resonator is changed respectively by $2 \times 10^{-3}$ and $-2 \times 10^{-3}$ in response to the voltages applied to the resonator. Referring to FIG. 14B, plot 650 shows the amplitude response of the resonator when the resonator receives no bias and thus its index of refraction is unchanged. Plots 652 and 654 show the phase response of the resonator when the index of the refraction of the resonator is changed respectively by $2 \times 10^{-3}$ and $-2 \times 10^{-3}$ in response to the voltages applied to the resonator.

Figure 15:
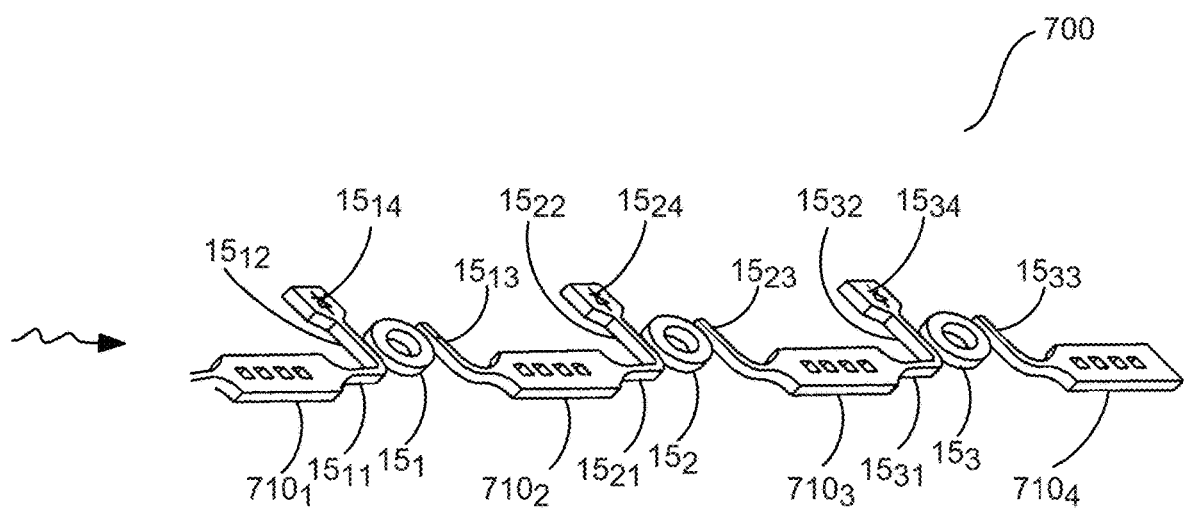
FIG. 15 is a simplified perspective view of a one-dimensional array of optical signal radiators and delay elements, in accordance with one exemplary embodiment of the present invention.

FIG. 15 is a simplified schematic diagram of an array 700 of optical signal radiators and delay elements, in accordance with another embodiment of the present invention. Phased array 700 is shown as including four gratings 710$_1$, 710$_2$, 710$_3$, and 710$_4$ and three ring resonators 15$_1$, 15$_2$, and 15$_3$ each associated with and disposed between a different pair of the gratings. Each ring resonator 15$_k$ (k is an integer varying from 1 to 3 in this exemplary embodiment) is shown as having an input port 15$_{k1}$, a through port 15$_{k2}$, and a drop port 15$_{k3}$. Associated with each resonator 15$_k$ is a photo-diode formed along the resonator's through port. Accordingly, photo-diode 15$_{14}$ is formed in through port 15$_{12}$ of resonator 15$_1$; photo-diode 15$_{24}$ is formed in through port 15$_{22}$ of resonator 15$_2$; and photo-diode 15$_{34}$ is formed in through port 15$_{32}$ of resonator 15$_3$. Photo-diodes 15$_{k4}$ are used to achieve ring resonance frequency alignment. The gratings in phased array 700 have similarly sized grooves.

Figure 16:
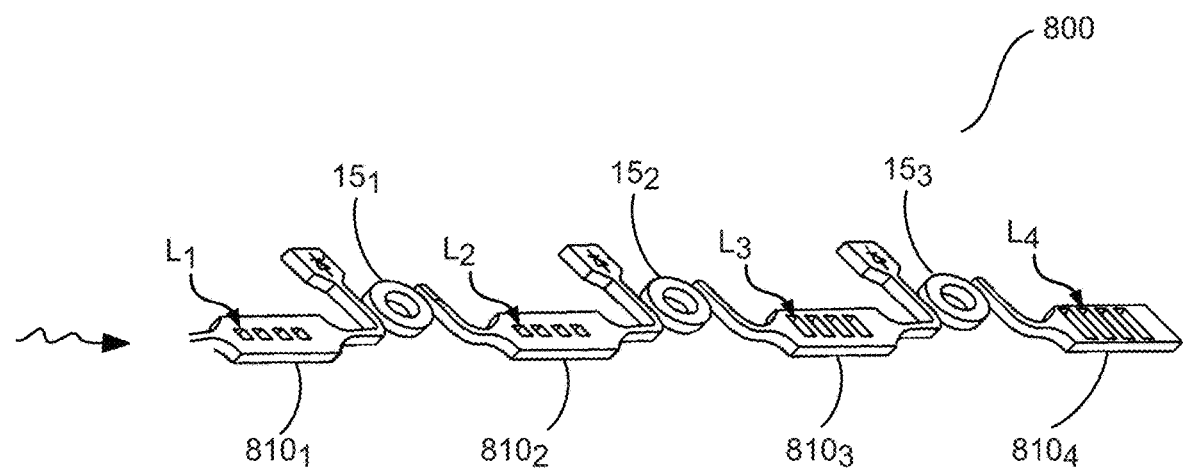
FIG. 16 is a simplified perspective view of a one-dimensional array of optical signal radiators and delay elements, in accordance with one exemplary embodiment of the present invention.

FIG. 16 is a simplified schematic diagram of an array 800 of optical signal emitter and delay elements, in accordance with another embodiment of the present invention. Phased array 800 is similar to phased array 700 except that in phased array 800 the length of the grooves in each grating is larger than the length of the grooves of the adjacent grating from which that grating receives the incoming optical signal. In other words, the groove lengths of neighboring gratings increase along the direction of beam travel. Accordingly $L_2$ is selected to be greater than $L_1$, $L_3$ is selected to be greater than $L_2$, and $L_4$ is selected to be greater than $L_3$, thus causing the intensity of the output beams radiating from gratings 810$_1$, 810$_2$, 810$_3$, and 810$_4$ to vary in accordance with the grove lengths of the gratings. In one embodiment, $L_1$, $L_2$, $L_3$ and $L_4$ are selected such that the intensity of the optical signals emitted from gratings 810$_1$, 810$_2$, 810$_3$, 810$_4$ are substantially similar.

Figure 17:
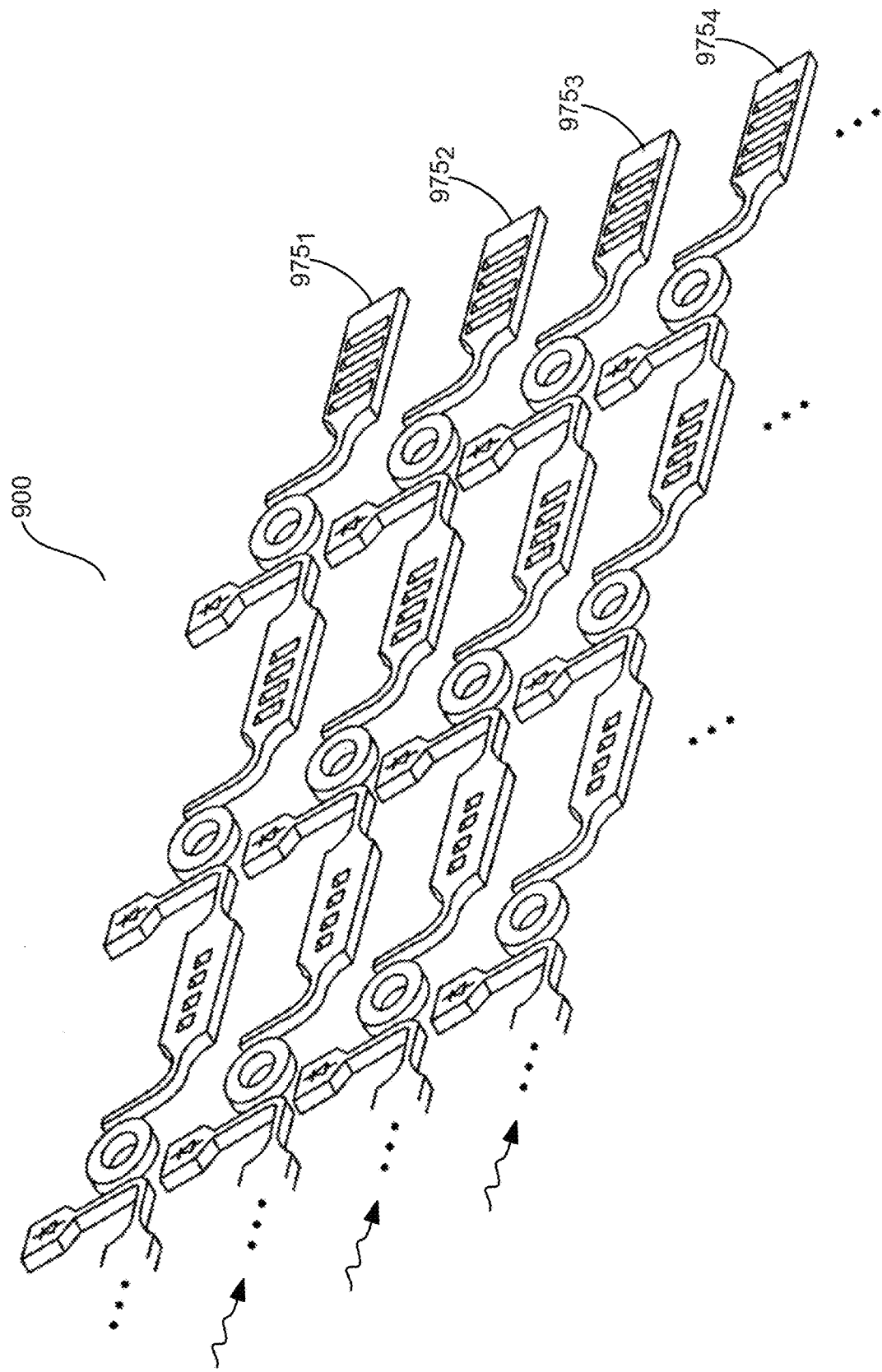
FIG. 17 is a simplified perspective view of a two-dimensional array of optical signal radiators and delay elements, in accordance with another exemplary embodiment of the present invention.

FIG. 17 shows a two-dimensional optical phased array 900 having four arrays 975$_1$, 975$_2$, 975$_3$, 975$_4$ each of which is similar to one-dimensional array 800 shown in FIG. 16. Optical phased array 900 is thus a 4×4 array of optical emitters and phase/delay elements. In one embodiment an 8×8 array (not shown) of optical emitters and phase/delay elements formed by doubling the array sizes of phased array 900 may occupy an area of 100 µm². Furthermore, since each ring resonator may be tuned and used as a switch to disconnect an associated signal emitter, the number of the phased array elements in both dimensions may be adjusted electronically. It is understood that any of the one-dimensional phased arrays described herein may be used to form a two-dimensional phased array, such as that shown in FIG. 17. Furthermore, any of the two-dimensional optical phased arrays may be stacked to form a three-dimensional phased array, as shown for example by stacking a multitude of two dimensional arrays of FIG. 3B to form the three-dimensional array of FIG. 3C. For example, although not shown, it is understood that a three-dimensional phased-array may be formed by stacking a multitude of two-dimensional phased-arrays of FIG. 17.

Figure 18A:
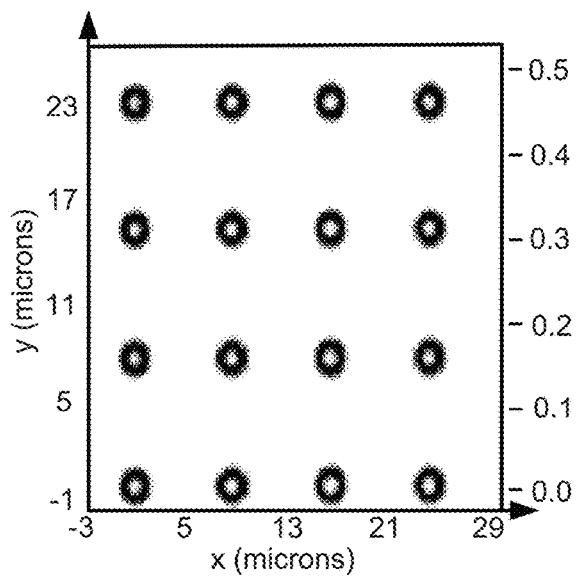
FIG. 18A-D show the near-field and far-field simulated beam pattern of a two-dimensional 4×4 planar optical phased array under various phase conditions.
Figure 18B:
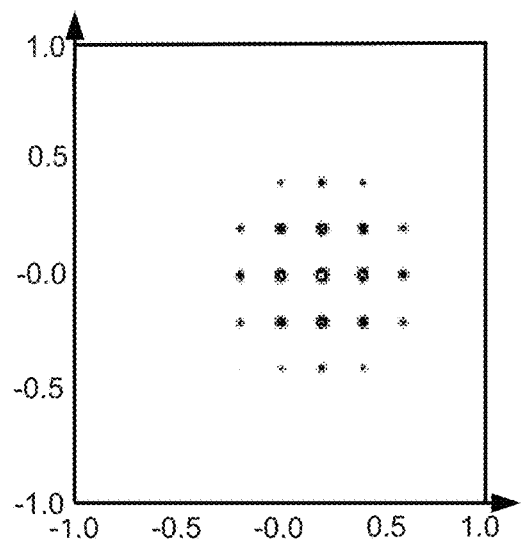
Figure 18C:
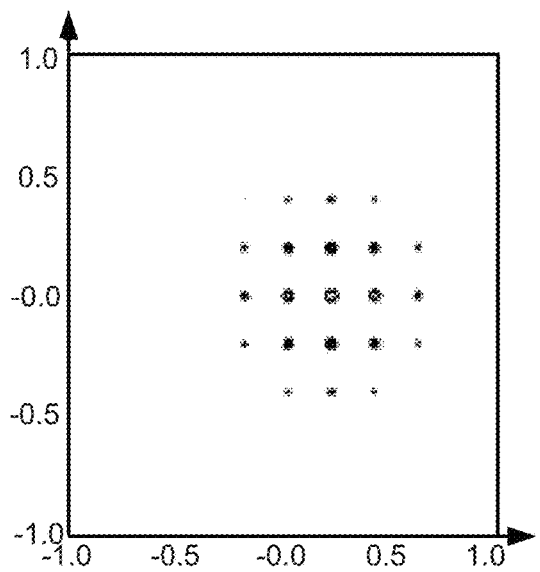
Figure 18D:
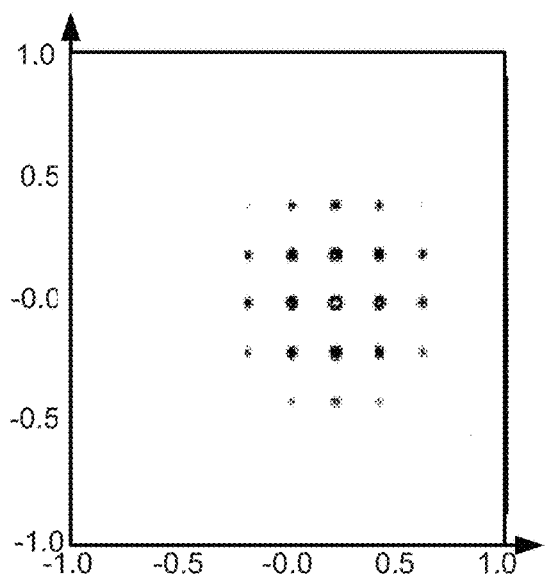

FIG. 18A shows the near-field simulated beam pattern of a two-dimensional 4×4 planar optical phased array. Each of the arrays is similar to array 800 shown in FIG. 16. FIG. 18B shows the far field simulated pattern of a two-dimensional 4×4 planar optical phased array when the optical signals emitted are selected to be in phase. FIGS. 18C and 18D respectively show the far-field simulated pattern with phase progression in horizontal and vertical directions respectively.

Figure 19:
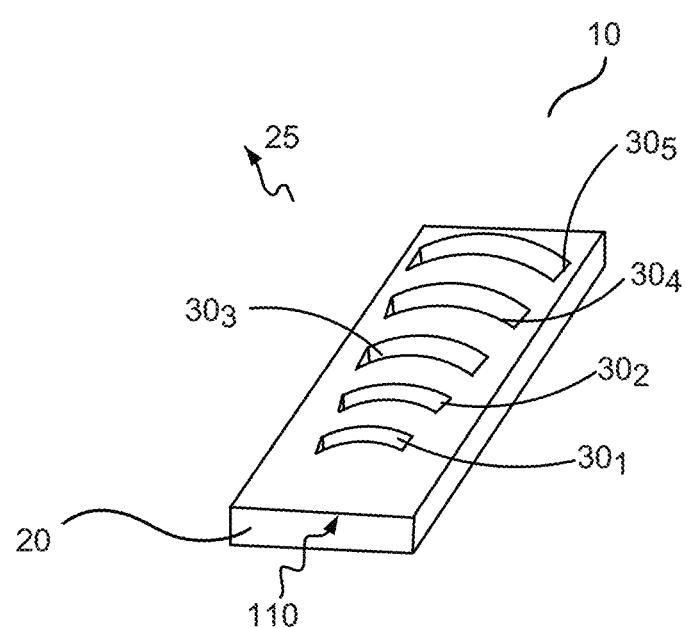
FIG. 19 is a perspective view of an optical grating adapted to provide optical signal phase/delay, in accordance with one embodiment of the present invention.

FIG. 19 is a perspective view of another exemplary embodiment of an optical grating 10 as used in an optical phased array, in accordance with the present invention. Optical grating 10 of FIG. 20 is shown as including five grooves 30$_1$, 30$_2$, 30$_3$, 30$_4$, 30$_5$ that are tapered and curved such that the length L of the grooves increases in succession along the direction of the beam travel. Accordingly, groove 30$_2$ is selected to be longer than groove 30$_1$; groove 30$_3$ is selected to be longer than groove 30$_2$; groove 30$_4$ is selected to be longer than groove 30$_3$; and groove 30$_5$ is selected to be longer than groove 30$_4$. Although exemplary grating 10 of FIG. 20 is shown as including five grooves, it is understood that grating 10 may have more or fewer than four groves. By selecting the grooves to have increasingly greater lengths along the direction of travel of the received optical signal 110, the intensity of the output beam 25 radiated out from grating 10 may be varied.

The above embodiments of the present invention are illustrative and not limitative. Embodiments of the present invention are not limited by the type of optical signal radiator or optical signal phase/delay elements disposed in a phased array. Embodiments of the present invention are not limited by the number of grooves in an optical grating, or the number of optical gratings disposed in a phased array when optical gratings are used as optical signal radiators. Embodiments of the present invention are not limited by the wavelength of the incoming optical signal, nor are they limited by the type of substrate, semiconductor or otherwise, in which the optical phased array may be formed. Embodiments of the present invention are not limited by the number of arrays used to form a two-dimensional array or the number of two-dimensional arrays used to a form a stack of three-dimensional array. Other additions, subtractions or modifications are obvious in view of the present disclosure and are intended to fall within the scope of the appended claims.

What is claimed is:

1. An optical phased array comprising:
a first array of N optical signal emitters, said array receiving a first optical signal, each optical signal emitter emitting a portion of the received optical signal into free space, said N being an integer greater than or equal to 2; and
a first array of M optical signal delay elements, each optical signal delay element being associated with and disposed between a different pair of optical signal emitters, each optical signal delay element causing a difference between phases of the optical signals emitted from its associated pair of optical signal emitters, wherein M is an integer greater than or equal to one.

2. The optical phased array of claim 1 wherein the phase difference caused by each of the M optical signal delay elements is variable.

3. The optical phased array of claim 2 wherein the phase differences caused by at least a subset of the M optical signal delay elements are varied so as to change an angle of an output optical signal generated due to interference between one or more of N optical signals emitted by the N optical signal emitters.

4. The optical phased array of claim 1 wherein each of the M optical signal delay elements is a ring resonator.

5. The optical phased array of claim 4 wherein each of the M optical ring resonators is a p-i-n junction causing a phase difference in response to an applied bias.

6. The optical phased array of claim 1 wherein each of the N optical signal emitters is an optical grating comprising a plurality of grooves.

7. The optical phased array of claim 6 wherein groove lengths of the N optical gratings are selected so as to increase along a direction of travel of the first optical signal through the optical phase array.

8. The optical phased array of claim 7 wherein the groove lengths of the N optical gratings are selected so as to achieve a substantially similar intensity for the N emitted optical signals.

9. The optical phased array of claim 1 further comprising:
a second array of K optical signal emitters formed parallel to the first array of the N optical signal emitters, said second array receiving a second optical signal, said K being an integer greater than 2; and
a second array of L optical signal delay elements, each of the L optical signal delay elements being associated with and disposed between a different pair of the K optical signal emitters, each of the L optical signal delay elements causing a difference between phases of the optical signals emitted from its associated pair of optical signal emitters, wherein L is an integer greater than or equal to one.

10. The optical phased array of claim 9 wherein the N optical signals emitted from the first array of N optical signal emitters and the K optical signals emitted from the second array of K optical signal emitters have substantially similar wavelengths.

11. The optical phased array of claim 1 wherein the first array of N optical signal emitters and the first array of M optical signal delay elements are formed in a first semiconductor substrate.

12. The optical phased array of claim 9 wherein the first array of N optical signal emitters, the second array of K optical signal emitters, the first array of the M optical signal delay elements, and the second array of the L optical signal delay elements are formed in a first semiconductor substrate.

13. The optical phased array of claim 9 wherein said first and second optical signals are derived from a same source of optical signal.

14. The optical phased array of claim 9 further comprising:
a third array of P optical signal emitters receiving a third optical signal, said P being an integer greater than 2; and
a third array of Q optical signal delay elements, each of the Q optical signal delay elements being associated with and disposed between a different pair of P optical signal emitters, each of the Q optical signal delay elements causing a difference between phases of the optical signals emitted from its associated pair of optical signal emitters wherein Q is an integer greater than or equal to one.

15. The optical phased array of claim 1 wherein the optical signals emitted by the first array of N optical signal emitters are substantially parallel to a surface of a substrate in which the first array of N optical signal emitters and the first array of M optical signal delay elements are formed.

16. The optical phased array of claim 1 wherein the optical signals emitted by the first array of N optical signal emitters are substantially perpendicular to a surface of a substrate in which the first array of N optical signal emitters and the first array of M optical signal delay elements are formed.

17. A method of generating N optical signals, N being an integer greater than or equal to 2, the method comprising:
forming a first array of N optical signal emitters said array receiving a first optical signal, each optical signal emitter emitting a portion of the received optical signal into free space; said N being an integer greater than or equal to 2; and
forming a first array of M optical signal delay elements, each optical signal delay element being associated with and disposed between a different pair of optical signal emitters, each optical signal delay element causing a difference between phases of the optical signals emitted from its associated pair of optical signal emitters, wherein M is an integer greater than or equal to one.

18. The method of claim 17 further comprising: varying the phase difference caused by each of the M optical signal phase elements.

19. The method of claim 18 further comprising:
varying the phase difference caused by at least a first subset of the M optical signal delay elements so as to change an angle of an output optical signal generated due to interference between one or more of N optical signals emitted by the N optical signal emitters.

20. The method of claim 17 wherein each of the M optical signal delay elements is a ring resonator.

21. The method of claim 20 wherein each of the M optical ring resonators is a p-i-n junction causing a phase difference in response to an applied bias.

22. The method of claim 17 wherein each of the N optical signal emitters is an optical grating comprising a plurality of grooves.

23. The method of claim 22 further comprising:
selecting groove lengths of the N optical gratings in an increasing order along a direction of travel of the first optical signal through the optical phase array.

24. The method of claim 23 further comprising:
selecting the groove lengths of the N optical gratings such that intensities of the N emitted optical signals are substantially similar.

25. The method of claim 17 further comprising:
forming a second array of K optical signal emitters parallel to the first array of the N optical signal emitters, said second array receiving a second optical signal, said K being an integer greater than 2; and
forming a second array of L optical signal delay elements, each of the L optical signal delay elements being associated with and disposed between a different pair of the K optical signal emitters, each of the L optical signal delay elements causing a difference between phases of the optical signals emitted from its associated pair of optical signal emitters, wherein L is an integer greater than or equal to one.

26. The method of claim 25 wherein the N optical signals emitted from the first array of N optical signal emitters and the K optical signals emitted from the second array of K optical signal emitters have substantially similar wavelengths.

27. The method of claim 17 further comprising:
forming the first array of N optical signal emitters and the first array of M optical signal delay elements in a first semiconductor substrate.

28. The method of claim 25 further comprising:
forming the first array of N optical signal emitters, the second array of K optical signal emitters, the first array of the M optical signal delay elements, and the second array of the L optical signal delay elements in a first semiconductor substrate.

29. The method of claim 25 further comprising:
generating the first and second optical signals from a same source of an optical signal.

30. The method of claim 17 further comprising:
forming a third array of P optical signal emitters receiving a third optical signal, said P being an integer greater than 2; and
forming a third array of Q optical signal delay elements, each of the Q optical signal delay elements being associated with and disposed between a different pair of the P optical signal emitters, each of the Q optical signal delay elements causing a difference between phases of the optical signals emitted from its associated pair of optical signal emitters, wherein Q is an integer greater than or equal to one.

31. The method of claim 17 wherein the optical signals emitted by the first array of N optical signal emitters are substantially parallel to a surface of a substrate in which the first array of N optical signal emitters and the first array of M optical signal delay elements are formed.

32. The method of claim 17 wherein the optical signals emitted by the first array of N optical signal emitters are substantially perpendicular to a surface of a substrate in which the first array of N optical signal emitters and the first array of M optical signal delay elements are formed.

33. The optical phased array of claim 14 wherein the first array of N optical signal emitters, the second array of K optical signal emitters, the third array of P optical emitters, the first array of the M optical signal delay elements, the second array of L optical signal delay elements, and the third array of Q optical signal delay elements are formed in a first semiconductor substrate.

34. The optical phased array of claim 14 wherein the first array of N optical signal emitters, the second array of K optical signal emitters, the first array of the M optical signal delay elements, and the second array of L optical signal delay elements are formed in a first semiconductor substrate, and wherein the third array of P optical emitters, and the third array of Q optical signal delay elements are formed in a second semiconductor substrate, wherein said first and second semiconductor substrate are positioned to form a stack.

35. The optical phased array of claim 9 wherein said first and second optical signals are received from at least two different sources of optical signals.

36. The optical phased array of claim 14 wherein said first, second and third optical signals are received from a same source of optical signal.

37. The optical phased array of claim 14 wherein said first, second and third optical signals are received from at least three different sources of optical signals.

38. The method of claim 30 wherein the first array of N optical signal emitters, the second array of K optical signal emitters, the third array of P optical emitters, the first array of the M optical signal delay elements, the second array of L optical signal delay elements, and the third array of Q optical signal delay elements are formed in a first semiconductor substrate.

39. The method of claim 30 wherein the first array of N optical signal emitters, the second array of K optical signal emitters, the first array of the M optical signal delay elements, and the second array of L optical signal delay elements are formed in a first semiconductor substrate, and wherein the third array of P optical emitters, and the third array of Q optical signal delay elements are formed in a second semiconductor substrate, wherein said first and second semiconductor substrate are positioned to form a stack.

40. The method of claim 25 wherein said first and second optical signals are received from at least two different sources of optical signals.

41. The method of claim 30 wherein said first, second and third optical signals are received from a same source of optical signal.

42. The optical phased array of claim 30 wherein said first, second and third optical signals are received from at least three different sources of optical signals.

43. The optical phased array of claim 14 wherein the first array of N optical signal emitters and the first array of the M optical signal delay elements are formed in a first semiconductor substrate, wherein the second array of K optical signal emitters and the second array of L optical signal delay elements are formed in a second semiconductor substrate, and wherein the third array of P optical emitters and the third array of Q optical signal delay elements are formed in a third semiconductor substrate, wherein said first, second, and third semiconductor substrate form a stack.

44. The method of claim 30 further comprising:
forming the first array of N optical signal emitters and the first array of the M optical signal delay elements in a first semiconductor substrate;
forming the second array of K optical signal emitters and the second array of L optical signal delay elements in a second semiconductor substrate;
forming the third array of P optical emitters and the third array of Q optical signal delay elements in a third semiconductor substrate; and stacking the first, second, and third semiconductor substrates.

\* \* \* \* \*